United States Patent
Koss et al.

(10) Patent No.: US 7,157,070 B2
(45) Date of Patent: Jan. 2, 2007

(54) METHOD FOR PURIFYING GAS CONTAINING HYDROCARBONS

(75) Inventors: Ulrich Koss, Darmstadt (DE); Max-Michael Weiss, Oberursel (DE); Thomas Tork, Frankfurt am Main (DE)

(73) Assignee: Lurgi AG, Frankfurt am Main (DE)

(*) Notice: Subject to any disclaimer, the term of this patent is extended or adjusted under 35 U.S.C. 154(b) by 0 days.

(21) Appl. No.: 10/513,261

(22) PCT Filed: Apr. 2, 2003

(86) PCT No.: PCT/EP03/03413

§ 371 (c)(1),
(2), (4) Date: Aug. 23, 2005

(87) PCT Pub. No.: WO03/092862

PCT Pub. Date: Nov. 13, 2003

(65) Prior Publication Data

US 2006/0067875 A1    Mar. 30, 2006

(30) Foreign Application Priority Data

May 3, 2002    (DE) .............................. 102 19 900

(51) Int. Cl.
*C01B 17/02* (2006.01)
*C01B 31/20* (2006.01)
*B01D 53/14* (2006.01)
*B01D 53/56* (2006.01)

(52) U.S. Cl. .................. 423/573.1; 423/574.1; 423/228; 423/229

(58) Field of Classification Search .......... 423/573.1, 423/574.1, 575, 576.2, 228, 229; 48/127.3, 48/127.5

See application file for complete search history.

(56) References Cited

U.S. PATENT DOCUMENTS

| | | | |
|---|---|---|---|
| 3,848,071 A * | 11/1974 | Gorenendaal | 423/574.1 |
| 3,989,811 A | 11/1976 | Hill | 423/573 G |
| 4,153,674 A * | 5/1979 | Verloop et al. | 423/575 |
| 4,263,270 A * | 4/1981 | Groenendaal et al. | 423/574.1 |
| 4,289,738 A * | 9/1981 | Pearce et al. | 423/228 |
| 4,372,925 A | 2/1983 | Cornelisse | 423/226 |
| 4,412,977 A * | 11/1983 | Fisch | 423/226 |
| 4,430,316 A * | 2/1984 | Ranke et al. | 423/574.1 |
| 4,519,991 A * | 5/1985 | Oliveau et al. | 423/220 |
| 4,552,572 A * | 11/1985 | Galstaun | 55/36 |
| 5,556,606 A * | 9/1996 | Khanmamedov | 423/228 |
| 5,718,872 A * | 2/1998 | Khanmamedov | 422/168 |
| 2005/0103194 A1* | 5/2005 | Huder et al. | 95/235 |

FOREIGN PATENT DOCUMENTS

WO   WO9726069   7/1997
WO   WO9726070   7/1997

* cited by examiner

*Primary Examiner*—Colleen P. Cooke
(74) *Attorney, Agent, or Firm*—Norris McLaughlin & Marcus PA

(57) ABSTRACT

A hydrocarbon gas containing $H_2S$, mercaptans and $CO_2$ is fed to an absorption plant operated at a pressure of 20 to 80 bar and supplied with a selective solvent, a solvent stream loaded with $H_2S$ and a roughly desulfurized gas stream are withdrawn, the $H_2S$ loaded solvent stream is charged to a regeneration plant and the roughly desulfurized gas stream is charged to an absorption and regeneration plant operated at a pressure of 20 to 80 bar, a large first gas stream of $H_2S$ and $CO_2$ and an unloaded solvent stream are withdrawn from the absorption regeneration plant, and the large first gas steam of $H_2S$ and $CO_2$ is supplied to a Claus plant, and a valuable hydrocarbon gas stream is withdrawn from the absorption and regeneration plant.

9 Claims, 1 Drawing Sheet

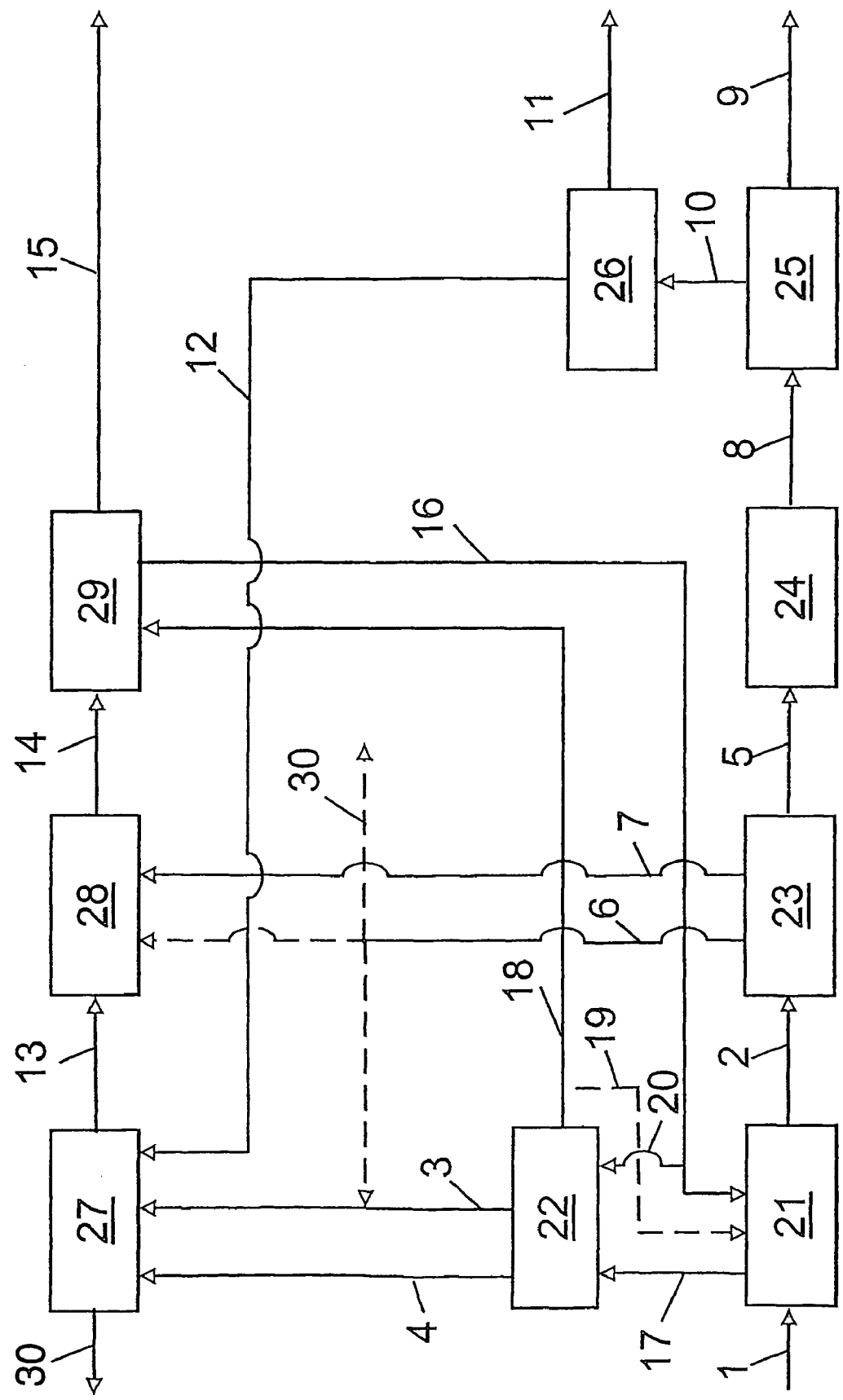

METHOD FOR PURIFYING GAS CONTAINING HYDROCARBONS

This is a 371 of PCT/EP03/03413 filed 2 Apr. 2003 (international filing date).

This invention relates to a process of cleaning gas, in particular hydrocarbonaceous gas such as e.g. natural gas, which is contaminated with sulfur in the form of $H_2S$ and mercaptan as well as $CO_2$.

BACKGOUND OF THE INVENTION

The document WO 97/26069 describes a process of cleaning gases containing carbon dioxide and sulfur, in which there are sulfur-contaminated impurities in the form of mercaptans and $H_2S$. In a first absorption, the sulfur-contaminated impurities are removed from the gas, in order to produce a clean gas stream and a sour gas stream, the sour gas being hydrogenated in order to convert a major amount of mercaptans to $H_2S$. The hydrogenated sour gas is introduced into a second absorption/regeneration plant, in which the sour gas is separated into a first gas stream rich in $H_2S$, which is introduced into a Claus plant, and a second gas stream containing little $H_2S$, which is supplied to the post-combustion. The Claus plant is followed by a tail gas aftertreatment, in which the $H_2S$ is reduced further and a gas rich in $H_2S$ is withdrawn.

Another unpublished application describes a process for removing the undesired sulfur-containing substances in the form of $H_2S$ and mercaptan from crude gas. Crude gas is introduced into an absorption and regeneration column and washed therein, three gas streams being withdrawn from this absorption and regeneration column. A first exhaust gas stream is introduced into a Claus plant, a second sour gas stream with a low concentration of $H_2S$ is introduced into another absorption plant, and a third gas stream, the valuable gas with the mercaptans, is cooled and supplied to an adsorption plant. From this adsorption plant, a cleaned valuable gas is withdrawn and a gas stream containing mercaptan is subjected to washing, which is then supplied to the Claus plant.

What is disadvantageous in these processes is the considerable effort for raising the $H_2S$ content of the exhaust gas of the first washing stage operating at high pressure, which removes both the $H_2S$ contained in the feed gas and the entire $CO_2$, such that an easy and economically expedient generation of sulfur in the Claus plant is possible. There is required a second absorption plant, whose operation for reprocessing the solvent used consumes very much energy. The operation of this absorption plant, and in particular the adjustment with the other plant components, is very expensive and complicated.

It is the object underlying the invention to create an improved process for cleaning hydrocarbonaceous gas, in which the energy consumption and thus the costs for generating a feed gas as rich in $H_2S$ as possible for the Claus plant can distinctly be decreased.

SUMMARY OF THE INVENTION

In accordance with the invention, this object is solved in that before the absorption and regeneration plant operated at a pressure of the feed gas of 20–80 bar abs. another absorption plant is provided, which operates at the same pressure of 20–80 bar abs with a selective solvent and roughly desulfurizes the feed gas to 100–10,000 ppmV $H_2S$, a solvent stream loaded with hydrogen sulfide being withdrawn from this preceding absorption plant and being supplied to a succeeding regeneration, that from the preceding absorption plant a third gas stream, the roughly desulfurized crude gas, is supplied to the absorption and regeneration plant, and from this absorption and regeneration plant the valuable gas is withdrawn, which is supplied to a further use.

DETAILED DESCRIPTION

Due to the rough preliminary desulfurization by the preceding absorption plant, the first small gas stream, which is supplied from the regeneration plant to the Claus plant, consists of up to 95 vol-% hydrocarbon and up to 30 vol-% carbon dioxide. The second gas stream, which is supplied from the regeneration plant to the Claus plant, consists of 20 to 90 vol-% hydrogen sulfide, maximally 80 vol-% carbon dioxide, and small amounts of mercaptan.

Due to the fact that from the preceding absorption column a solvent stream highly loaded with $H_2S$ is withdrawn and supplied to the regeneration plant, the solvent stream is by 30 to 60% smaller than in accordance with the prior art, depending on the plant configuration. Thus, the energy consumption for the regeneration likewise is smaller by 30 to 60%.

The roughly desulfurized crude gas is withdrawn from the preceding absorption column as second gas stream and supplied to a second washing stage comprising absorption and regeneration. Since in this second washing stage only a very small amount of $H_2S$ must be washed out apart from $CO_2$, the required amount of solvent also is distinctly smaller here than in the prior art, namely 20 to 70% smaller in dependence on the $H_2S/CO_2$ ratio, so that here as well 45% less regeneration energy is required.

As preferred solvent of the preceding absorption plant, there is typically used methyldiethanolamine (MDEA).

The preceding, selective absorption plant is configured such that beside a rather large amount of $H_2S$ a rather small amount of $CO_2$ is absorbed. It is known that in the case of the solvent MDEA the absorption of $CO_2$ is limited by the absorption rate, so that it can be minimized by only briefly bringing the feed gas in contact with the solvent MDEA. The contact time necessary for the absorption of $H_2S$ decreases with increasing pressure of the feed gas and at a pressure of e.g. 50 bar abs lies in the range of up to 20 seconds.

As product, there is obtained a gas which has a low content of $H_2S$ (typically 100–10,000 ppmV), but still contains a large part of the $CO_2$ contained in the feed gas. Both the $CO_2$ and the remaining small amount of $H_2S$ then are completely removed from the valuable gas in the succeeding high-pressure washing stage and discharged as exhaust gas together with a part of the mercaptan contained in the feed gas. The degree of sulfur recovery of the entire plant is increased in that this exhaust gas is introduced into the hydrogenation of the tail gas plant, in order to convert sulfur components into $H_2S$, and is then introduced into the absorption plant of the tail gas plant.

Since the low $H_2S$ content required for the valuable gas need only be achieved after this second high-pressure washing stage, the preceding absorption plant can employ solvent which comes from the tail gas washing stage of the Claus plant and already contains $H_2S$ and $CO_2$. The total amount of MDEA solution to be reprocessed in a regeneration thus is minimized. Alternatively, unloaded solvent can also be used. The $H_2S$ concentrations in the exhaust gas supplied from the regeneration to the Claus plant, which can be achieved by a suitable configuration of the absorption plant, are higher than those to be achieved in accordance with the prior art, so that the Claus plant can be designed correspondingly smaller.

BRIEF DESCRIPTION OF THE DRAWING

The drawing illustrates the components of the process.

Embodiments of the process will be explained by way of example with reference to the drawing.

Via line (1), crude gas is introduced into a first absorption column (21), in which most of the $H_2S$ contained is washed out. As solvent, a solvent stream (16) is supplied to the absorption column (21), which solvent stream was pre-loaded with $H_2S$ and $CO_2$ in a succeeding tail gas absorption plant (29).

From the absorption column (21), a solvent stream (17) highly loaded with $H_2S$ is withdrawn and supplied to a regeneration plant (22). From the regeneration plant (22), a first small gas stream (3) is directly supplied to the Claus plant (27). This exhaust gas stream (3) chiefly consists of up to 95 vol-% hydrocarbon and up to 30 vol-% $CO_2$ with small amounts of mercaptan (up to 0.3 vol-%) and $H_2S$ (up to 5 vol-%).

A second, larger gas stream (4), which contains 20–90 vol-% $H_2S$, 10–80 vol-% $CO_2$ and up to 3000 ppmV mercaptan, likewise is directly supplied to the Claus plant (27). As further stream, an unloaded solvent stream (18) is withdrawn, which is supplied to the tail gas absorption plant (29). Should the amount of solvent required in the first absorption column (21) be larger than the one used in the tail gas absorption plant (29), it is also possible that via line (19) unloaded solvent is directly supplied from the regeneration plant (22) to the absorption column (21). Should the amount of solvent required in the first absorption column (21) be smaller than the one used in the tail gas absorption plant (29), it is also possible that via line (20) preloaded solvent is directly supplied from the tail gas absorption plant (29) to the regeneration plant (22).

From the absorption column (21), a second gas stream (2), the roughly desulfurized crude gas, is withdrawn and supplied to a second washing stage (23) comprising absorption and regeneration. The roughly desulfurized crude gas (2) still contains a large part of the mercaptan contained in the crude gas, 100–10,000 ppmV $H_2S$ and 50–95% of the $CO_2$ contained in the crude gas. From this second washing stage (23), a first gas stream (6) is withdrawn, which in one of the other partial plants (e.g. Claus plant (27) or hydrogenation (28) or for instance in a not represented exhaust gas post-combustion) is utilized as fuel gas or can be discharged to the outside via line (30). This gas stream (6) chiefly consists of up to 80 vol-% hydrocarbon and up to 20 vol-% $CO_2$ with small amounts of mercaptan (up to 0.3 vol-%) and $H_2S$ (up to 5000 ppmV). As second gas stream (5), the valuable gas with the largest part of the mercaptan is withdrawn from the second washing stage (23) via line (5) and then e.g. cooled (24) and supplied to an adsorption (25) via line (8) for removing the mercaptan. A third gas stream from the absorption plant (23), which contains up to 99.8 vol-% $CO_2$, up to 10 vol-% $H_2S$ and 0.2 vol-% mercaptan, is supplied to a hydrogenation (28) via line (7).

The Claus plant (27) is a plant known per se, which consists of a combustion furnace as well as a plurality of catalytic reactors for performing the reaction. The liquid sulfur obtained is withdrawn via line (30) and supplied to a further use. In the Claus plant (27), there is always obtained a so-called residual Claus gas, which apart from non-condensed elementary sulfur contains unreacted sulfur dioxide and $H_2S$. This residual gas is withdrawn via line (13) and subjected to an aftertreatment, in order to increase the degree of sulfur recovery. Via line (13), the residual Claus gas is supplied to a hydrogenation plant (28), which via line (7) is also supplied with the gas from the second washing stage (23). In the hydrogenation (28), mercaptan and $SO_2$ are converted to $H_2S$ and supplied to an absorption plant (29) via line (14). From the absorption plant (29), a solvent loaded with $H_2S$ and $CO_2$ is supplied via line (16) to the first absorption column (21) for the further absorption of $H_2S$, before it is reprocessed in the regeneration plant (22) as described above and the entire $H_2S$ obtained is supplied to the Claus plant (27). In this way, a high degree of sulfur recovery is achieved.

The remaining gas only contains very little (up to 2000 ppmV) $H_2S$ and is withdrawn from the absorption plant (29) via line (15) and for instance supplied to a combustion.

EXAMPLE

The following Table shows an analysis of the gas streams and the liquid process streams in the individual lines.

| Line No.: | 1 | | | | 2 | | | | 3 | | | |
|---|---|---|---|---|---|---|---|---|---|---|---|---|
| Process Stream | Crude Gas | | | | Roughly Desulfurized Crude Gas | | | | First Let-down Gas Stream to Claus Plant | | | |
| Phase | gas | | | | gas | | | | gas | | | |
| Components | Nm³/h | kg Mole/h | ppm V | Vol % | Nm³/h | kg Mole/h | ppm V | Vol % | Nm³/h | kg Mole/h | ppm V | Vol % |
| CO2 | 21680 | 967.3 | | 2.59 | 18645 | 831.85 | | 2.25 | 5.24 | 0.23 | | 0.98 |
| N2 | 29102 | 1298.4 | | 3.48 | 29093 | 1298.0 | | 3.51 | 9.03 | 0.40 | | 1.68 |
| CH4 | 705460 | 31474.1 | | 84.26 | 704982 | 31453 | | 85.00 | 461.87 | 20.61 | | 86.18 |
| C2H6 | 45661 | 2037.1 | | 5.45 | 45629 | 2035.7 | | 5.50 | 29.41 | 1.31 | | 5.49 |
| C3H8 | 18593 | 829.5 | | 2.22 | 18575 | 828.7 | | 2.24 | 17.17 | 0.77 | | 3.20 |
| i-C4 | 2981 | 133.0 | | 0.36 | 2981 | 133.0 | | 0.36 | 0.57 | 0.03 | | 0.11 |
| n-C4 | 4333 | 193.3 | | 0.52 | 4331 | 193.2 | | 0.52 | 1.89 | 0.08 | | 0.35 |
| i-C5 | 1203 | 53.7 | | 0.14 | 1203 | 53.7 | | 0.15 | 0.21 | 0.01 | | 0.04 |
| n-C5 | 1040 | 46.4 | | 0.12 | 1040 | 46.4 | | 0.13 | 0.21 | 0.01 | | 0.04 |
| C6 cut | 751 | 33.5 | | 0.09 | 751 | 33.5 | | 0.09 | 0.25 | 0.01 | | 0.05 |
| C7 cut | 379 | 16.9 | | 0.05 | 379 | 16.9 | | 0.05 | 0.03 | 0.00 | | 0.01 |
| C8 | 140 | 6.2 | | 0.02 | 140 | 6.2 | | 0.02 | 0.01 | 0.00 | | 0.00 |
| C9 | 93 | 4.1 | | 0.01 | 93 | 4.1 | | 0.01 | 0.05 | 0.00 | | 0.01 |
| H2S | 5851 | 26103 | | 0.699 | 401.4 | 17.91 | 484 | 0.05 | 5.41 | 0.24 | | 1.01 |

-continued

| | | | | | | | | | | | | |
|---|---|---|---|---|---|---|---|---|---|---|---|---|
| COS | | 2.5 | 0.11 | 3 | 0.0003 | 1.7 | 0.07 | 2 | 0.0002 | 0.01 | 0.00 | 20 | 0.00 |
| CH3SH | | 21.8 | 0.97 | 26 | 0.0026 | 19.9 | 0.89 | 24 | 0.0024 | 0.13 | 0.01 | 250 | 0.03 |
| C2H5SH | | 117.2 | 5.23 | 140 | 0.0140 | 99.5 | 4.44 | 120 | 0.0120 | 0.63 | 0.03 | 1170 | 0.12 |
| C3H7SH | | 47.7 | 2.13 | 57 | 0.0057 | 46.4 | 2.07 | 56 | 0.0056 | 0.29 | 0.01 | 540 | 0.05 |
| C4H9SH | | 5.0 | 0.22 | 6 | 0.0006 | 5.0 | 0.22 | 6 | 0.0006 | 0.05 | 0.00 | 90 | 0.01 |
| CS2 | | | | | | | | | | | | | |
| SO2 | | | | | | | | | | | | | |
| SX | | | | | | | | | | | | | |
| CO | | | | | | | | | | | | | |
| H2 | | | | | | | | | | | | | |
| O2 | | | | | | | | | | | | | |
| H2O | | saturated! | | | | 1019 | 45.48 | | 0.12 | 3.49 | 0.16 | | 0.65 |
| Flow | Nm³/h | 837240 | | | 100.00 | 829433 | | | 100.00 | 536 | | | 100.00 |
| Flow | kg/h | 723091 | | | | 709163 | | | | 449 | | | |
| Flow | Kgmole/h | 37353 | | | | 37005 | | | | 24 | | | |
| Flow | MMSCFD | 750.00 | | | | 743.01 | | | | 0.480 | | | |
| Mole Wt. | Kg/Kg mole | 19.36 | | | | 19.16 | | | | 18.77 | | | |
| Temp. | °C. | 10 | | | | 42 | | | | 29 | | | |
| Pressure | bar (abs) | 68.0 | | | | 67.8 | | | | 6.0 | | | |
| Density | Kg/m³ | | | | | | | | | | | | |
| Vap. Frac | — | 1.0 | | | | 1.0 | | | | 1.0 | | | |

| Line No.: | | 4 | | | | 5 | | | | 6 | | | |
|---|---|---|---|---|---|---|---|---|---|---|---|---|---|
| Process Stream | | Exhaust Gas Rich in H₂S to Claus Plant | | | | Valuable Gas for Gas Cooling | | | | Second Let-down Gas Stream | | | |
| Phase | | gas | | | | gas | | | | gas | | | |
| Components | | Nm³/h | kg Mole/h | ppm V | Vol % | Nm³/h | kg Mole/h | Ppm V | Vol % | Nm³/h | kg Mole/h | ppm V | Vol % |
| CO2 | | 5625.8 | 250.99 | | 46.01 | 41 | 1.81 | 50 | 0.005 | 72.63 | 3.24 | | 18.59 |
| N2 | | | | | | 29087 | 1297.72 | | 3.59 | 5.47 | 0.24 | | 1.40 |
| CH4 | | 17.12 | 0.76 | | 0.14 | 704689 | 31439.68 | | 86.94 | 266.08 | 11.87 | | 68.10 |
| C2H6 | | 2.45 | 0.11 | | 0.02 | 45600 | 2034.46 | | 5.63 | 24.22 | 1.08 | | 6.20 |
| C3H8 | | 1.22 | 0.05 | | 0.01 | 18564 | 828.25 | | 2.29 | 8.60 | 0.38 | | 2.20 |
| i-C4 | | | | | | 2979 | 132.92 | | 0.37 | 1.56 | 0.07 | | 0.40 |
| n-C4 | | | | | | 4329 | 193.13 | | 0.53 | 2.03 | 0.09 | | 0.52 |
| i-C5 | | | | | | 1202 | 53.64 | | 0.15 | 0.59 | 0.03 | | 0.15 |
| n-C5 | | | | | | 1039 | 46.36 | | 0.13 | 0.51 | 0.02 | | 0.13 |
| C6 cut | | | | | | 750 | 33.48 | | 0.09 | 0.39 | 0.02 | | 0.10 |
| C7 cut | | | | | | 379 | 16.91 | | 0.05 | 0.16 | 0.01 | | 0.04 |
| C8 | | | | | | 140 | 6.23 | | 0.02 | 0.08 | 0.00 | | 0.02 |
| C9 | | | | | | 93 | 4.14 | | 0.01 | 0.04 | 0.00 | | 0.01 |
| H2S | | 6174.5 | 275.47 | | 50.50 | 2.5 | 0.11 | 3 | 0.000 | 0.39 | 0.02 | | 0.10 |
| COS | | 0.8 | 0.04 | 69 | 0.01 | 0.4 | 0.019 | 1 | 0.00 | 0.01 | 0.00 | 20 | 0.00 |
| CH3SH | | 1.7 | 0.08 | 141 | 0.01 | 16.5 | 0.738 | 20 | 0.00 | 0.11 | 0,00 | 280 | 0.03 |
| C2H5SH | | 17.1 | 0.76 | 1395 | 0.14 | 82.6 | 3.686 | 102 | 0.01 | 0.59 | 0.03 | 1500 | 0.15 |
| C3H7SH | | 1.0 | 0.04 | 81 | 0.01 | 44.6 | 1.990 | 55 | 0.01 | 0.21 | 0.01 | 540 | 0.05 |
| C4H9SH | | 0.0 | 0.00 | 0 | 0.00 | 4.7 | 0.212 | 6 | 0.00 | 0.02 | 0.00 | 60 | 0.01 |
| CS2 | | | | | | | | | | | | | |
| SO2 | | | | | | | | | | | | | |
| SX | | | | | | | | | | | | | |
| CO | | | | | | | | | | | | | |
| H2 | | | | | | | | | | | | | |
| O2 | | | | | | | | | | | | | |
| H2O | | 385 | 17.18 | | 3.15 | 1528 | 68.17 | | 0.19 | 7.05 | 0.31 | | 1.80 |
| Flow | Nm³/h | 12227 | | | 100.0 | 810572 | | | 100.0 | 391 | | | 100.0 |
| Flow | kg/h | 20818 | | | | 672080 | | | | 414 | | | |
| Flow | Kgmole/h | 545 | | | | 36164 | | | | 17 | | | |
| Flow | MMSCFD | 10.953 | | | | 726.111 | | | | 0.350 | | | |
| Mole Wt. | kg/kg mole | 38.16 | | | | 18.58 | | | | 23.74 | | | |
| Temp. | °C. | 35 | | | | 50 | | | | 47 | | | |
| Pressure | bar (abs) | 1.8 | | | | 66.8 | | | | 6.0 | | | |
| Density | kg/m³ | | | | | | | | | | | | |
| Vap. Frac | — | 1.0 | | | | 1.0 | | | | 1.0 | | | |

-continued

| Line No.: | | 7 | | | | 8 | | | | 9 | | | |
|---|---|---|---|---|---|---|---|---|---|---|---|---|---|
| Process Stream | | Exhaust Gas Rich in $CO_2$ to Hydrogenation | | | | Cooled Valuable Gas to Mole Sieve Plant | | | | Sweet Gas | | | |
| Phase | | gas | | | | gas | | | | gas | | | |
| Components | | $Nm^3/h$ | kg Mole/h | ppm V | Vol % | $Nm^3/h$ | kg Mole/h | ppm V | Vol % | $Nm^3/h$ | kg Mole/h | ppm V | Vol % |
| CO2 | | 18532 | 826.80 | | 90.78 | 41 | 1.81 | | 0.005 | 41 | 1.81 | | 0.005 |
| N2 | | | | | | 29087 | 1297.72 | | 3.59 | 29073 | 1297.07 | | 3.60 |
| CH4 | | 26.54 | 1.18 | | 0.13 | 704689 | 31439.68 | | 87.1 | 704337 | 31423.96 | | 87.12 |
| C2H6 | | 4.08 | 0.18 | | 0.02 | 45600 | 2034.46 | | 5.64 | 45578 | 2033.44 | | 5.64 |
| C3H8 | | 2.04 | 0.09 | | 0.01 | 18564 | 828.25 | | 2.29 | 18550 | 827.63 | | 2.29 |
| i-C4 | | | | | | 2979 | 132.92 | | 0.37 | 2978 | 132.85 | | 0.37 |
| n-C4 | | | | | | 4329 | 193.13 | | 0.53 | 4327 | 193.03 | | 0.54 |
| i-C5 | | | | | | 1202 | 53.64 | | 0.15 | 1202 | 53.61 | | 0.15 |
| n-C5 | | | | | | 1039 | 46.36 | | 0.13 | 1039 | 46.34 | | 0.13 |
| C6 cut | | | | | | 750 | 33.48 | | 0.09 | 749 | 33.42 | | 0.09 |
| C7 cut | | | | | | 379 | 16.91 | | 0.05 | 377 | 16.82 | | 0.05 |
| C8 | | | | | | 140 | 6.23 | | 0.02 | 138 | 6.16 | | 0.02 |
| C9 | | | | | | 93 | 4.14 | | 0.01 | 89 | 3.95 | | 0.01 |
| H2S | | 398.6 | 17.78 | 19525 | 1.95 | 2 | 0.11 | 3 | 0.00 | 2.5 | 0.110 | 3 | 0.00 |
| COS | | 1.22 | 0.05 | 60 | 0.01 | 0 | 0.02 | 1 | 0.00 | 0.4 | 0.019 | 1 | 0.00 |
| CH3SH | | 3.27 | 0.15 | 160 | 0.02 | 17 | 0.74 | 20 | 0.002 | 0.2 | 0.011 | 0.3 | 0.00 |
| C2H5SH | | 16.33 | 0.73 | 800 | 0.08 | 83 | 3.69 | 102 | 0.01 | 1.4 | 0.063 | 1.7 | 0.0002 |
| C3H7SH | | 1.63 | 0.07 | 80 | 0.01 | 45 | 1.99 | 55 | 0.006 | 0.7 | 0.030 | 0.8 | 0.0001 |
| C4H9SH | | 0.20 | 0.01 | 10 | 0.00 | 5 | 0.21 | 6 | 0.001 | 0.1 | 0.004 | 0.1 | 0.000 |
| CS2 | | | | | | | | | | | | | |
| SO2 | | | | | | | | | | | | | |
| SX | | | | | | | | | | | | | |
| CO | | | | | | | | | | | | | |
| H2 | | | | | | | | | | | | | |
| O2 | | | | | | | | | | | | | |
| H2O | | 1428 | 63.71 | | 7.00 | 144 | 6.43 | | 0.02 | 1 | 0.04 | 1.0 | 0.0001 |
| Flow | $Nm^3/h$ | 20414 | | | 100.0 | 809188 | | | 100.0 | 808481 | | | 100.0 |
| Flow | kg/h | 38232 | | | | 670968 | | | | 670035 | | | |
| Flow | Kgmole/h | 911 | | | | 36102 | | | | 36070 | | | |
| Flow | MMSCFD | 18,287 | | | | 725 | | | | 724,237 | | | |
| Mole Wt. | kg/kg mole | 41.98 | | | | 19 | | | | 18.58 | | | |
| Temp. | ° C. | 50 | | | | 10 | | | | 25 | | | |
| Pressure | bar (abs) | 1.8 | | | | 66.5 | | | | 65.2 | | | |
| Density | $Kg/m^3$ | | | | | | | | | | | | |
| Vap. Frac. | — | 1.0 | | | | 1 | | | | 1.0 | | | |

| Line No.: | | 10 | | | | 11 | | | | 12 | | | |
|---|---|---|---|---|---|---|---|---|---|---|---|---|---|
| Process Stream | | Gas Stream Containing Mercaptan | | | | Fuel Gas to Plant Boundary | | | | Enriched Mercaptan Gas to Claus Plant | | | |
| Phase | | gas | | | | gas | | | | gas | | | |
| Components | | $Nm^3/h$ | kg Mole/h | ppm V | Vol % | $Nm^3/h$ | kg Mole/h | ppm V | Vol % | $Nm^3/h$ | kg Mole/h | ppm V | Vol % |
| CO2 | | | | | | | | | | | | | |
| N2 | | 7814.5 | 348.65 | | 29.27 | 7812.2 | 348.54 | | 29.55 | 2.3 | 0.10 | | 0.80 |
| CH4 | | 18552.3 | 827.71 | | 69.49 | 18447 | 822.99 | | 69.78 | 105.7 | 4.72 | | 36.13 |
| C2H6 | | 22.8 | 1.02 | | 0.09 | 22.3 | 1.00 | | 0.08 | 0.5 | 0.02 | | 0.16 |
| C3H8 | | 13.9 | 0.62 | | 0.05 | 11.9 | 0.53 | | 0.05 | 2.0 | 0.09 | | 0.68 |
| i-C4 | | 1.5 | 0.07 | | 0.01 | 1.0 | 0.05 | | 0.00 | 0.4 | 0.02 | | 0.15 |
| n-C4 | | 2.2 | 0.10 | | 0.01 | 1.8 | 0.08 | | 0.01 | 0.4 | 0.02 | | 0.12 |
| i-C5 | | 0.6 | 0.03 | | 0.00 | 0.3 | 0.01 | | 0.00 | 0.3 | 0.02 | | 0.12 |
| n-C5 | | 0.5 | 0.02 | | 0.00 | 0.2 | 0.01 | | 0.00 | 0.3 | 0.01 | | 0.10 |
| C6 cut | | 1.3 | 0.06 | | 0.00 | | | | | 1.3 | 0.06 | | 0.44 |
| C7 cut | | 2.1 | 0.09 | | 0.01 | | | | | 2.1 | 0.09 | | 0.71 |
| C8 | | 1.7 | 0.08 | | 0.01 | | | | | 1.7 | 0.08 | | 0.60 |
| C9 | | 4.3 | 0.19 | | 0.02 | | | | | 4.3 | 0.19 | | 1.47 |
| H2S | | | | | | | | | | | | | |
| COS | | | | | | | | | | | | | |
| CH3SH | | 16.3 | 0.73 | 610 | 0.061 | 0.2 | 0.009 | 8 | 0.001 | 16.1 | 0.72 | | 5.49 |
| C2H5SH | | 81.2 | 3.62 | 3042 | 0.304 | 0.3 | 0.014 | 12 | 0.001 | 80.9 | 3.61 | | 27.64 |
| C3H7SH | | 43.9 | 1.96 | 1645 | 0.165 | 0.9 | 0.040 | 34 | 0.003 | 43.0 | 1.92 | | 14.70 |
| C4H9SH | | 4.7 | 0.21 | 174 | 0.017 | 0.7 | 0.029 | 25 | 0.003 | 4.0 | 0.18 | | 1.36 |
| CS2 | | | | | | | | | | | | | |
| SO2 | | | | | | | | | | | | | |
| SX | | | | | | | | | | | | | |
| CO | | | | | | | | | | | | | |
| H2 | | | | | | | | | | | | | |
| O2 | | | | | | | | | | | | | |

-continued

| | | | | | | | | | | | | |
|---|---|---|---|---|---|---|---|---|---|---|---|---|
| H2O | | 135 | 6.02 | 0.51 | 135 | 6.04 | 0.51 | 27 | 1.22 | | 9.31 | |
| Flow | Nm³/h | 26699 | | 100.00 | 26434 | | 100.00 | 293 | | | 100.00 | |
| Flow | kg/h | 23698 | | | 23142 | | | 578 | | | | |
| Flow | Kgmole/h | 1191 | | | 1179 | | | 13 | | | | |
| Flow | MMSCFD | 23.917 | | | 23.679 | | | 0.262 | | | | |
| Mole Wt. | kg/kg mole | 19.89 | | | 19.62 | | | 44.27 | | | | |
| Temp. | °C. | 50 | | | 50 | | | 57 | | | | |
| Pressure | bar (abs) | 24.9 | | | 24.6 | | | 1.9 | | | | |
| Density | kg/m³ | | | | | | | | | | | |
| Vap. Frac | — | 1.0 | | | 1 | | | 1.0 | | | | |

| Line No.: | | 13 | | | | 14 | | | | 15 | | | |
|---|---|---|---|---|---|---|---|---|---|---|---|---|---|
| Process Stream | | Residual Claus Gas to Hydrogenation | | | | Hydrogenated Residual Claus Gas to Tail Gas Absorption | | | | Exhaust Gas to Postcombustion | | | |
| Phase | | gas | | | | gas | | | | gas | | | |
| Components | | Nm³/h | kg Mole/h | ppm V | Vol % | Nm³/h | kg Mole/h | ppm V | Vol % | Nm³/h | kg Mole/h | ppm V | Vol % |
| CO2 | | 6026 | 268.84 | | 17.61 | 25958 | 1158.10 | | 42.82 | 23362 | 1042.29 | | 43.23 |
| N2 | | 17220 | 768.27 | | 50.31 | 21420 | 955.65 | | 35.34 | 21420 | 955.65 | | 39.64 |
| CH4 | | | | | | 40.9 | 1.83 | | 0.07 | 41 | 1.83 | | 0.08 |
| C2H6 | | | | | | 18.2 | 0.81 | | 0.03 | 18 | 0.81 | | 0.03 |
| C3H8 | | | | | | 3.5 | 0.16 | | 0.01 | 4 | 0.16 | | 0.01 |
| i-C4 | | | | | | | | | | | | | |
| n-C4 | | | | | | | | | | | | | |
| i-C5 | | | | | | | | | | | | | |
| n-C5 | | | | | | | | | | | | | |
| C6 cut | | | | | | | | | | | | | |
| C7 cut | | | | | | | | | | | | | |
| C8 | | | | | | | | | | | | | |
| C9 | | | | | | | | | | | | | |
| H2S | | 137 | 6.09 | | 0.40 | 757.7 | 33.81 | | 1.25 | 27.02 | 1.21 | 500 | 0.05 |
| COS | | 60 | 2.67 | | 0.17 | 3.8 | 0.17 | | 0.01 | 3.76 | 0.17 | 70 | 0.01 |
| CH3SH | | | | | | 0.97 | 0.04 | | 0.00 | 0.97 | 0.04 | | 0.00 |
| C2H5SH | | | | | | 5.15 | 0.23 | | 0.01 | 5.15 | 0.23 | 95 | 0.01 |
| C3H7SH | | | | | | 0.42 | 0.02 | | 0.00 | 0.42 | 0.02 | 8 | 0.00 |
| C4H9SH | | | | | | | | | | | | | |
| CS2 | | 7 | 0.33 | | 0.02 | | | | | | | | |
| SO2 | | 71 | 3.16 | | 0.21 | | | | | | | | |
| SX | | 14 | 0.61 | | 0.04 | | | | | | | | |
| CO | | 634 | 28.30 | | 1.85 | 99.72 | 4.45 | | 0.16 | 99.72 | 4.45 | | 0.18 |
| H2 | | 372 | 16.61 | | 1.09 | 1156.1 | 51.58 | | 1.91 | 1156.1 | 51.58 | | 2.14 |
| O2 | | | | | | | | | | | | | |
| H2O | | 9686 | 432.15 | | 28.30 | 11154 | 497.62 | | 18.40 | 7898 | 352.35 | | 14.62 |
| Flow | Nm³/h | 34227 | | | 100.00 | 60618 | | | 100.00 | 54035 | | | 100.00 |
| Flow | kg/h | 42578 | | | | 88170 | | | | 79345 | | | |
| Flow | Kgmole/h | 1527 | | | | 2704 | | | | 2411 | | | |
| Flow | MMSCFD | 31 | | | | 54.301 | | | | 48.405 | | | |
| Mole Wt. | kg/kg mole | 27.88 | | | | 32.60 | | | | 32.91 | | | |
| Temp. | °C. | 165 | | | | 175 | | | | 55 | | | |
| Pressure | bar (abs) | 1.3 | | | | 1.2 | | | | 1.1 | | | |
| Density | Kg/m³ | | | | | | | | | | | | |
| Vap. Frac. | — | 1.0 | | | | 1.0 | | | | 1.0 | | | |

| Line No.: | | 17 | | | 18 | | | 19 | | |
|---|---|---|---|---|---|---|---|---|---|---|
| Process Stream | | Loaded MDEA | | | Regenerated MDEA | | | Preloaded MDEA | | |
| Phase | | liquid | | | liquid | | | liquid | | |
| Components | | kg/h | kg mole/h | Wt. % | kg/h | kg mole/h | Wt. % | kg/h | kg mole/h | Wt. % |
| CO2 | | 11177.6 | 253.98 | 2.62 | 121.1 | 2.8 | 0.03 | 5217.9 | 118.6 | 1.26 |
| N2 | | 11.3 | 0.40 | 0.00 | | | | | | |
| CH4 | | 342.8 | 21.37 | 0.08 | | | | | | |
| C2H6 | | 42.7 | 1.42 | 0.01 | | | | | | |
| C3H8 | | 36.2 | 0.82 | 0.01 | | | | | | |
| i-C4 | | 1.5 | 0.03 | 0.00 | | | | | | |
| n-C4 | | 4.9 | 0.08 | 0.00 | | | | | | |
| i-C5 | | 0.7 | 0.01 | 0.00 | | | | | | |
| n-C5 | | 0.7 | 0.01 | 0.00 | | | | | | |
| C6 cut | | 0.9 | 0.01 | 0.00 | | | | | | |
| C7 cut | | 0.1 | 0.00 | 0.00 | | | | | | |
| C8 | | 0.0 | 0.00 | 0.00 | | | | | | |
| C9 | | 0.3 | 0.00 | 0.00 | | | | | | |

-continued

| | | | | | | | | | | |
|---|---|---|---|---|---|---|---|---|---|---|
| H2S | | 9490.2 | 278.47 | 2.23 | 93.8 | 2.8 | 0.02 | 1204.8 | 35.4 | 0.29 |
| COS | | 2.3 | 0.04 | 0.00 | | | | | | |
| CH3SH | | 4.0 | 0.08 | 0.00 | | | | | | |
| C2H5SH | | 49.0 | 0.79 | 0.01 | | | | | | |
| C3H7SH | | 4.3 | 0.06 | 0.00 | | | | | | |
| C4H9SH | | 0.2 | 0.00 | 0.00 | | | | | | |
| CS2 | | | | | | | | | | |
| SO2 | | | | | | | | | | |
| SX | | | | | | | | | | |
| CO | | | | | | | | | | |
| H2 | | | | | | | | | | |
| O2 | | | | | | | | | | |
| MDEA | | 121440 | 1019 | 28.51 | 121440 | 1019 | 29.98 | 121440 | 1019 | 29.3 |
| H2O | | 283340 | 15727 | 66.52 | 283360 | 15728 | 69.96 | 286616 | 15909 | 69.15 |
| Flow | m³/h | 416.4 | | 100.0 | 400.2 | | 100.0 | 409.6 | | 100.0 |
| Flow | kg/h | 425950 | | | 405015 | | | 414479 | | |
| Flow | kgmole/h | 17304 | | | 16753 | | | 17082 | | |
| Flow | MMSCFD | — | | | — | | | — | | |
| Molar M. | kg/kgmole | 47.9 | | | 48.4 | | | 48.0 | | |
| T | °C. | 32.0 | | | 50.0 | | | 40.0 | | |
| P (abs.) | bar (abs) | 68.0 | | | 8.0 | | | 9.0 | | |
| Density | kg/m³ | 1023 | | | 1012 | | | 1012 | | |
| Vap. Frac. | — | 0.0 | | | 0.0 | | | 0.0 | | |

Corresponding to the values represented in the Table, crude gas is introduced via line (1) into a first absorption column (21), in which the $H_2S$ obtained is washed out except for a residual content of 484 ppmV. For this purpose, the solvent stream (16) preloaded with $H_2S$ and $CO_2$ in the tail gas absorption plant (29) is sufficient, so that washing in the absorption column (21) does not require an additional amount of solvent as compared to the amount required in the tail gas plant (29). The roughly desulfurized crude gas (2) still contains a large part (84%) of the $CO_2$ contained in the crude gas in addition to the residual content of $H_2S$, and also a large part of the mercaptan contained in the crude gas.

From the absorption column (21), a solvent stream (17) highly loaded with $H_2S$ is withdrawn and supplied to a regeneration plant (22). Since the solvent stream is by 47% smaller than in the example described in the unpublished prior art, the energy consumption for the regeneration likewise is smaller by 47%.

From the regeneration plant (22) a first small gas stream (3), which consists of 95 vol-% hydrocarbon and 1 vol-% $CO_2$ with about 1 vol-% sulfur and mercaptan, is directly supplied to the Claus plant (27).

A second, larger gas stream (4), which consists of 50.5 vol-% $H_2S$ and 46 vol-% $CO_2$, likewise is directly supplied to the Claus plant (27).

The roughly desulfurized crude gas is withdrawn from the absorption column (21) as second gas stream (2) and supplied to a second washing stage (23) comprising absorption and regeneration. Since in this second washing stage (23) only a very small amount of $H_2S$ must be washed out apart from $CO_2$, the required amount of solvent here is distinctly smaller than in the numerical example in the unpublished prior art, namely smaller by 45%, so that here as well 45% less regeneration energy is required. From this second washing stage, a first gas stream (6) is withdrawn, which consists of 77 vol-% hydrocarbon and 18.6 vol-% $CO_2$, and which in the Claus plant (27) is utilized as fuel gas. A second gas stream from the absorption plant (23), which contains 90.8 vol-% $CO_2$, 1.95 vol-% $H_2S$ and 0.1 vol-% mercaptan, is supplied to a hydrogenation (28) via line (7). As third gas stream (5), the valuable gas with the largest part of the mercaptan is withdrawn from the second washing stage (23), cooled (24) and supplied to an adsorption (25) via line (8). The gas stream (10) containing mercaptan is subjected to a physical washing stage (26), from which the coadsorbed valuable gas is recovered as fuel gas via line (11), and the highly concentrated mercaptan gas is supplied to the Claus plant (27) via line (12). A sweet gas stream is recovered via stream (9). The mercaptan stream is recovered in the regeneration of the Purisol solvent. The amount is small, but with a very high mercaptan concentration of 49 vol-%. In the Claus plant (27), the mercaptan is burnt completely. The resulting $SO_2$ is reacted with the $H_2S$ from the sour gas of line (4) to obtain sulfur. The liquid sulfur obtained is withdrawn via line (30) and supplied to a further use. The residual gas of the Claus plant chiefly consists of the components $CO_2$, $N_2$ and $H_2O$ and is withdrawn via line (13).

The invention claimed is:

1. A process for removing $H_2S$, mercaptans and $CO_2$ from a hydrocarbonaceous feed gas wherein the feed gas is supplied to an absorption plant operated at a pressure of 20 to 80 $bar_{abs}$ and supplied with a solvent which selectively absorbs $H_2S$; a solvent stream loaded with $H_2S$ and a roughly desulfurized gas stream, desulfurized to a $H_2S$ content of 100 to 10,000 ppmV, are withdrawn from the absorption plant; the solvent stream loaded with $H_2S$ is charged to a regeneration plant and the roughly desulfurized gas stream is charged to an absorption and regeneration plant operated with a pressure of 20 to 80 $bar_{abs}$; a first expansion gas stream, consisting essentially of hydrocarbon and $CO_2$, and a first waste gas stream, consisting essentially of $H_2S$, $CO_2$ and a minor amount of mercaptans, are withdrawn from the regeneration plant for the solvent stream loaded with $H_2S$ and are supplied to a Claus plant; and a valuable gas stream provided for a further utilization is withdrawn from the absorption and regeneration plant for the desulfurized gas stream.

2. The process of claim 1, wherein the first waste gas stream withdrawn from the regeneration plant is comprised of 20 to 80 vol-% $H_2S$, a maximum of 80 vol-% $CO_2$ and a minor amount of mercaptans.

3. The process of claim 1, wherein the first expansion gas stream withdrawn from the regeneration plant is comprised of up to 95 vol-% hydrocarbon and up to 30 vol-% $CO_2$.

4. The process of claim 1, wherein a regenerated solvent stream is withdrawn from the regeneration plant for the desulfurized gas stream and supplied to a tail gas absorption plant.

5. The process of claim 4, wherein a solvent stream loaded with $H_2S$ and $CO_2$ is discharged from the tail gas absorption plant and charged to the absorption plant for the feed gas stream.

6. The process of claim 1, wherein a hydrocarbonaceous second expansion gas stream is discharged from the absorption and regeneration plant for the desulfurized gas stream and wholly or partly supplied to a hydrogenation plant.

7. The process of claim 1, wherein a waste gas stream containing $CO_2$ is withdrawn from the absorption and regeneration plant for the desulfurized gas stream and charged to a hydrogenation plant.

8. The process of claim 1, wherein a hydrocarbonaceous second expansion gas stream is discharged from the absorption and regeneration plant for the desulfurized gas stream and is wholly or partly supplied to the Claus plant.

9. The process of claim 1, wherein said solvent which selectively absorbs $H_2S$ is methyldiethanolamine (MDEA).

* * * * *